H. L. KRUMWIEDE.
FILTER.
APPLICATION FILED APR. 15, 1920.
1,367,783.
Patented Feb. 8, 1921.
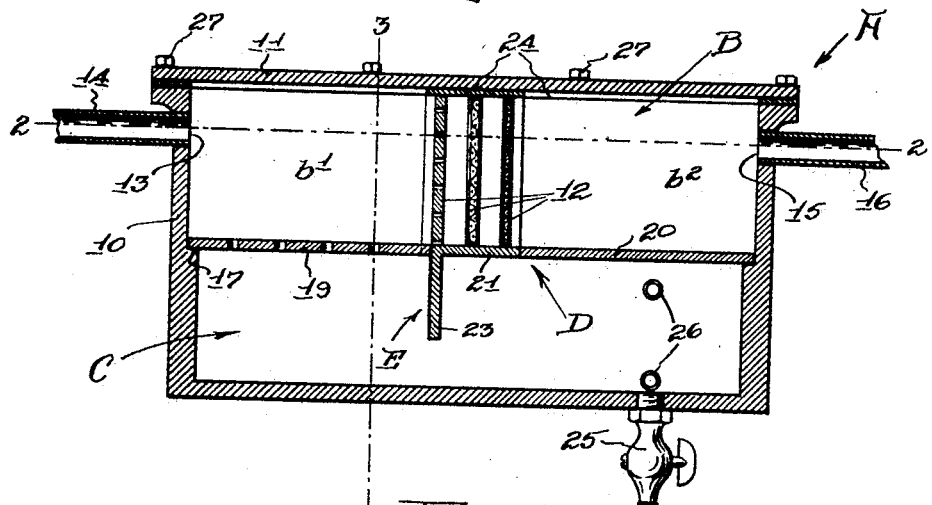
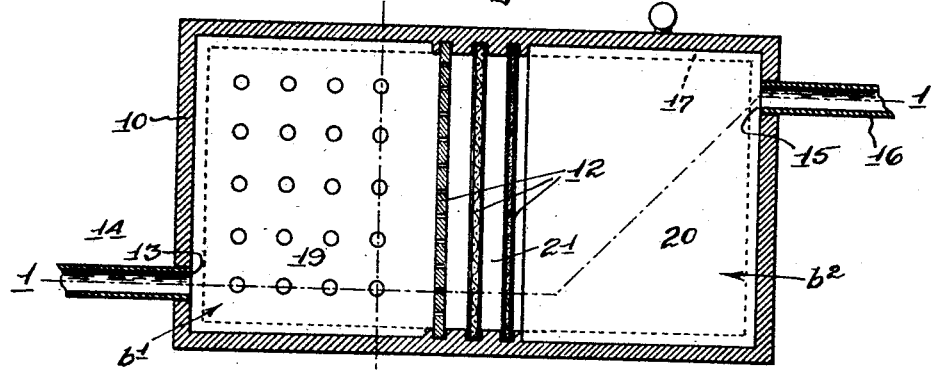
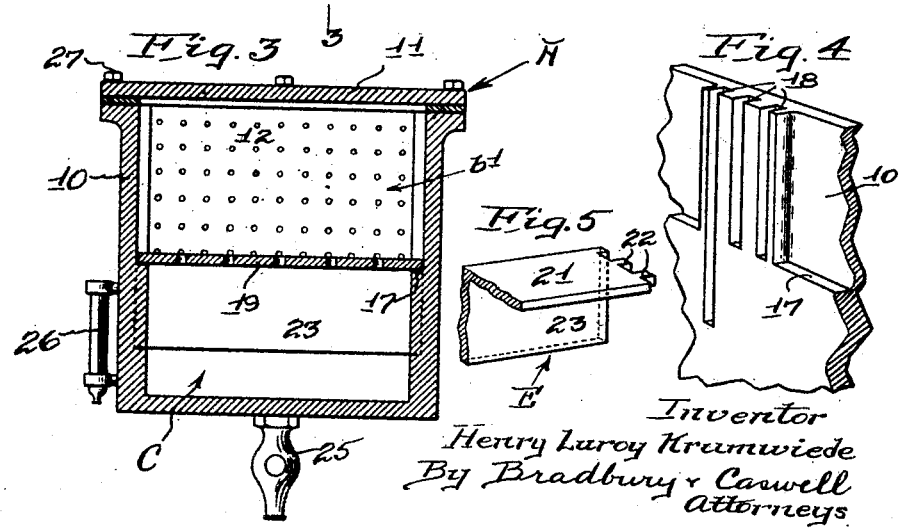
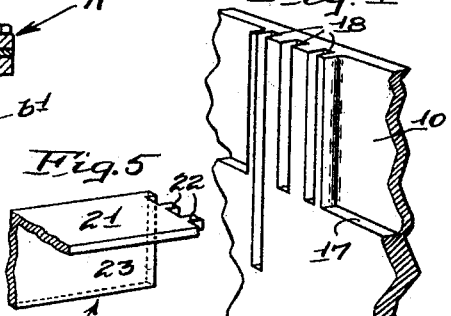
Inventor
Henry Luroy Krumwiede
By Bradbury & Caswell
Attorneys

UNITED STATES PATENT OFFICE.

HENRY LUROY KRUMWIEDE, OF MINNEAPOLIS, MINNESOTA.

FILTER.

1,367,783.   Specification of Letters Patent.   Patented Feb. 8, 1921.

Application filed April 15, 1920. Serial No. 374,132.

*To all whom it may concern:*

Be it known that I, HENRY LUROY KRUMWIEDE, a citizen of the United States, residing at Minneapolis, in the county of Hennepin and State of Minnesota, have invented a new and useful Filter, of which the following is a specification.

My invention relates to improvements in filters.

Its object is to provide a simple and durable device of this kind for pump or gravity lines, particularly those employed between tank cars and gasolene storage tanks, said device being adapted to separate water and foreign matter from gasolene passing therethrough and trap the same in a compartment therefor, said water and foreign matter when trapped, being withheld from contact with the filtering elements in said device.

A further object is to provide a device of this kind which may be quickly and easily disassembled for cleansing purposes or for the replacement of parts.

With the foregoing and other objects in view, which will appear in the following description, the invention resides in the novel combination and arrangement of parts and in the details of construction hereinafter described and claimed.

In the drawings Figures 1 and 2 are longitudinal sectional views of a filter embodying my invention, Fig. 1 being taken on the line 1—1 of Fig. 2 and Fig. 2 being taken on the line 2—2 of Fig. 1; Fig. 3 is a transverse sectional view taken on the line 3—3 of Figs. 1 and 2; Fig. 4 is a fragmentary perspective view of one side of the filter casing and shows the grooves for receiving the filtering screens and screen support and Fig. 5 is a fragmentary perspective view in detail showing one end of the removable screen support.

Referring to the drawings I have used the reference letter A to indicate a casing which comprises a box like body portion 10 and a cover plate 11 therefor. The casing A is divided into upper and lower compartments B and C by a horizontal partition D therein and said upper compartment is divided into inlet and outlet chambers $b^1$ and $b^2$ by a group of vertically arranged screens 12. An inlet opening 13, fitted with an inlet conduit 14, communicates with the inlet chamber $b^1$ and an outlet opening 15, fitted with an outlet conduit 16, and offset with respect to said inlet opening 13, communicates with the outlet chamber $b^2$. That portion of the partition D forming the bottom of the inlet chamber $b^1$ is perforated to permit the passage of water and foreign matter into the lower compartment or strap C.

Horizontal ledges 17 are formed on the sides and ends of the body portion 10 to carry the partition D and vertical grooves 18 are formed in the sides of said body portion for purposes to be presently described. The partition D consists of a perforated plate 19, an imperforate plate 20 and one member 21 of an angle bar E which forms a screen support. Said plates are seated at their margins on the ledges 17. The ends of the member 21 of said angle bar are notched to form tongues 22 designed to fit in said vertical grooves, one of said grooves on each side of the casing being longer than the others to receive the ends of the depending member 23 of said angle bar E. The screens 12 are fitted at their side margins in said grooves, the lower edges thereof resting upon the horizontal member 21 of the angle bar E. The screen 12, next adjacent to the inlet opening 13, is, preferably, a perforated plate its principal function being to receive the pressure of the incoming fluid and the impacts of foreign matter entering the inlet chamber, thus serving as a guard for the remaining and finer screens. The screen next to said plate is designed to separate the finer particles from gasolene passing therethrough, while the third screen is very fine and adapted to separate water from gasolene.

A gasket 24 fitted between the cover plate 11 and the body portion 10 of the casing includes a central cross piece which bears upon the upper margins of the screens 12.

In use, gasolene or the like is pumped or passes through my improved filter by gravity. The lower compartment or trap C is first filled with the fluid. The upper compartment B is thereafter filled and provides a course for the fluid between the inlet and outlet openings 13 and 15 in the casing A. The screens 12 prevent the passage of water or particles of foreign matter from the inlet chamber $b^1$ and said water and foreign particles, seeking a lower level, pass through the perforated plate 19 into the lower compartment or trap C, where they are retained and thereby held from contact with the filtering screens 12. The depending member 23 of the angle iron E forms a baffle plate between the ends of the lower compartment C and tends to arrest the wash of the fluid in said compartment, thereby preventing the return of water and foreign particles to the inlet chamber $b^1$. A pet cock 25 in the bottom of the casing provides for draining the same and a gage 26 on the side of said casing, shows the contents of the lower compartment C. Access to the filter is had by removing the cap screws 27 which hold the cover plate 11 on the body portion 10. The screens 12, screen support E and plates 19 and 20 may then be readily lifted from the casing.

Changes in the specific form of my invention, as herein disclosed, may be made within the scope of what is claimed without departing from the spirit of my invention.

Having described my invention, what I claim as new and desire to protect by Letters Patent is:

1. In a device of the class described a fluid tight casing with opposed screen receiving grooves on the inner sides thereof, a horizontal partition in said casing forming upper and lower compartments and comprising removable end plates and a removable screen support between said plates, said casing having inlet and outlet openings at opposite ends thereof communicating with said compartment and offset with respect to each other, and screens fitted at their margins in said grooves and traversing the upper compartment, said screens resting upon said screen support and forming opposed inlet and outlet chambers in said upper compartment, the plate at the bottom of said inlet chamber being perforated to permit the passage of water and foreign matter from said chamber into the lower compartment of the casing.

2. In a device of the class described, a fluid tight casing, a horizontal partition therein forming upper and lower compartments and comprising removable end plates and a removable screen support between said plates, said casing having inlet and outlet openings at opposite ends thereof communicating with said compartment, a group of spaced screens traversing the upper compartment and resting upon said screen support, said group of screens forming opposed inlet and outlet chambers in said upper compartment, said screens being removable from the casing and varying progressively in mesh, the coarsest screen being next adjacent to said inlet opening, the plate at the bottom of said inlet chamber being perforated to permit the passage of water and foreign matter from said chamber into the lower compartment of the casing, and a baffle plate, carried by and depending from the removable screen supporting plate, to arrest the back-wash of fluid within said lower compartment.

In testimony whereof, I have signed my name to this specification.

HENRY LUROY KRUMWIEDE